United States Patent [19]

Braley

[11] 4,383,868
[45] May 17, 1983

[54] TREATMENT OF SPILLAGES OF HAZARDOUS CHEMICALS

[76] Inventor: Gordon K. Braley, 84 St Helens Rd., Rainford, Nr St. Helens, WA11 7QP, England

[21] Appl. No.: 270,559

[22] Filed: Jun. 4, 1981

Related U.S. Application Data

[63] Continuation of Ser. No. 141,761, Apr. 21, 1980, abandoned.

[30] Foreign Application Priority Data

May 2, 1979 [GB] United Kingdom ............... 7915227

[51] Int. Cl.$^3$ .............................................. B08B 7/00
[52] U.S. Cl. ...................................... 134/7; 210/660; 210/728; 210/734
[58] Field of Search ............... 210/665, 660, 666, 667, 210/693, 694, 723, 725, 727, 728, 733, 734, 925; 134/3, 7

[56] References Cited

U.S. PATENT DOCUMENTS

| | | | |
|---|---|---|---|
| 3,023,162 | 2/1962 | Fordyce | 210/728 |
| 3,235,490 | 2/1966 | Goren | 210/733 |
| 3,278,506 | 10/1966 | Chamot | 210/733 |
| 3,367,918 | 2/1968 | Lensinski | 210/728 |
| 3,412,019 | 11/1968 | Hoover | 210/733 |
| 3,414,513 | 12/1968 | Buhl | 210/733 |
| 3,524,811 | 8/1970 | Tsuk | 210/728 |
| 3,876,573 | 4/1975 | Engelhard | 210/733 |
| 3,951,792 | 4/1976 | Azorlosa | 210/733 |
| 3,977,969 | 8/1976 | Zall | 210/925 |
| 4,056,112 | 11/1977 | Calmon | 134/7 |
| 4,210,460 | 7/1980 | Seidenberger | 134/7 |

OTHER PUBLICATIONS

Baier et al., Universal Gelling Agent for the Control of Hazardous Liquid Spills, Journal of Hazardous Materials, vol. 1, 1975/6, pp. 21–33.

Primary Examiner—Ernest G. Therkorn

[57] ABSTRACT

A method of treating a spillage of a hazardous chemical in liquid form by contacting the liquid chemical with a solid particulate mixture comprising a polyacrylamide and a polymer or copolymer of an alkyl(alk)acrylate, and a solid particulate mixture for use in the said method.

11 Claims, No Drawings

TREATMENT OF SPILLAGES OF HAZARDOUS CHEMICALS

This is a continuation of application Ser. No. 141,761, filed Apr. 21, 1980, now abandoned.

This invention relates to a method of treatment of spillages of hazardous chemicals in a liquid form, and in particular to a method of treatment of such spillages which mitigates the harmful effects produced by such spillages and which simplifies the problem of disposal of such spillages.

Many liquid chemicals when spilled must be rapidly contained and disposed of as such chemicals are often corrosive, poisonous and/or give off harmful vapour. Such spillages may occur for example when the liquid chemical is being handled, especially when being transported or when being transferred between vessels, or when a breakage occurs in a vessel or in the pipework associated with the plant in which the chemical is being manufactured or used. For example, a spillage may occur when a road or rail tanker containing such a liquid chemical is involved in an accident which results in rupture of the tanker. It is particularly desirable when such a spillage occurs that the liquid chemical be contained or otherwise immobilised and the emission of harmful vapours, if any, be stopped or at least be considerably reduced.

It is also desirable that the liquid chemical be converted to a form which eases the problem of removal and disposal of the chemical.

Liquid chemicals which are particularly hazardous when spilled include, for example, nitric acid, concentrated sulphuric acid, concentrated hydrochloric acid solution, aqueous sodium cyanide solution, bromine, titanium tetrachloride, oleum, chlorosulphonic acid and anhydrous hydrogen fluoride, although this list is by no means exhaustive and is merely given by way of example.

It is known to treat spillages of hazardous liquid chemicals by spreading a particulate solid material on the surface of the liquid chemical. For example, the particulate solid material may be an inert porous material, generally inorganic, which absorbs the liquid chemical. Alternatively, the particulate solid material may be, for example, an organic polymer which, depending on the nature of the liquid chemical, reacts with the liquid chemical to form a skin over the chemical or which forms a gel with the chemical, thus containing the spillage and at least decreasing the emission of harmful vapours from the chemical. A particulate solid material which is known to act in this way is polyacrylamide which has been described as a major component of a composition useful in the treatment of spillages of hazardous liquid chemicals. Particulate alkyl acrylate or alkyl alkacrylate polymers and copolymers in solid particulate form may also be used in the treatment of such spillages.

We have now found that a solid particulate mixture containing both polyacrylamide and a polyalkyl(alk)acrylate when applied to such a spillage immobilises the spillage and reduces the evolution of fumes from the spillage, and is more effective in the treatment of spillages of many hazardous liquid chemicals than is either the polyacrylamide or the polyalkyl(alk)acrylate when used alone.

According to the present invention we provide a method of treating a spillage of a chemical material in liquid form which method comprises contacting the liquid chemical with a solid particulate mixture comprising a polyacrylamide (as hereinafter defined) and a polymer or copolymer of an alkyl(alk)acrylate.

In a further embodiment of the invention there is also provided a solid particulate mixture as described.

The amount of the particulate mixture which is contacted with the liquid chemical will depend on a number of factors, for example, on the amount of liquid chemical in the spillage and on the area covered by the spillage of liquid chemical, on the nature of the liquid chemical, and, in the case where the chemical emits harmful vapours, on the need to stop or at least reduce the emission of the harmful vapours. In general, the amount of particulate mixture required will increase with increase in the amount of the spillage of liquid chemical, and also for a given volume of liquid chemical the amount of particulate mixture required will increase with the area covered by the spillage of liquid chemical. When contacting the particulate mixture with the spillage of liquid chemical it is desirable to cover substantially the whole of the exposed surface of the spillage with a layer of the particulate mixture in order to decrease, if not stop entirely, the emission of harmful vapours. It is also desirable to use sufficient particulate mixture to stop the liquid chemical flowing and preferably to form a solid layer over the surface of the spillage, for example, in the form of a crust, or form a gel with the spillage.

In general the mixture reacts more rapidly with the liquid chemical than does the polacrylamide or the polymer or copolymer of an alkyl(alk)acrylate alone. Furthermore, the mixture is more versatile in the treatment of spillages of hazardous liquid chemicals as it is effective in the treatment of some such chemicals where either polyacrylamide and/or poly alkyl (alk) acrylate alone are ineffective.

The particulate mixture may act on a spillage of liquid chemical in different ways depending on the nature of the chemical. For example, where the liquid chemical is anhydrous hydrogen fluoride the particulate mixture, in addition to forming a polymer skin over the surface of the spillage, appears to react substantially completely with the chemical to form a solid material which is relatively simply removed from the site of the spillage. On the other hand, where the liquid chemical is oleum or chlorosulphonic acid the particulate mixture forms a relatively impervious skin over the surface of the spillage thus decreasing the emission of harmful vapours and containing the extent of the spillage and immobilising the spillage. The chemical remains in liquid form below the surface of the skin and can be treated in a controlled manner, e.g. by neutralising with a base, or by further treatment with the particulate mixture.

The solid particulate mixture which is contacted with the spillage of liquid chemical material comprises a polyacrylamide and a polymer or copolymer of an alkyl(alk)acrylate. Within the scope of the term polyacrylamide we include polyacrylamide itself, polyalkyl acrylamides, e.g. polymethacrylamide, salts of polyacrylamide and polyalkylacrylamides, and copolymers of acrylamide and/or alkylacrylamide with one or more ethylenically unsaturated monomers and containing a substantial proportion, for example greater than 80 mole %, of units derived from acrylamide and/or alkylacrylamide. The mixture may contain more than one polyacrylamide.

The polymer or copolymer of the alkyl(alk)acrylate may be, for example, a polymer derived from one or more alkyl(alk)acrylates, e.g. methyl acrylate, ethyl acrylate, methyl methacrylate, butyl methacrylate or ethyl methacrylate, or it may be a copolymer of a substantial proportion of units derived from one or more alkyl(alk)acrylates, e.g. at least 80 mole %, and units derived from one or more ethylenically unsaturated monomers copolymerisable therewith. The mixture may contain more thn one polymer or copolymer of an alkyl(alk)acrylate.

In the solid particulate mixture the proportion of polymer or copolymer of alkyl(alk)acrylate is preferably at least 20% of the combined weight of the polyacrylamide and the polymer or copolymer of alkyl(alk)acrylate, more preferably at least 35% by weight, in order that a substantial synergistic effect of the two different polymer components of the solid particulate mixture may be obtained. For the same reasons it is preferred that the proportion of polymer or copolymer of alkyl(alk)acrylate is not greater than 80% by weight, more preferably not greater than 65% by weight.

The particle size of both of the polymer components of the solid particulate mixture is generally not greater than 5 mm, preferably not greater than 3 mm, more preferably not greater than 2 mm. In general the smaller the particle size the greater is the efficiency of the particulate mixture in the treatment of hazardous chemicals.

The solid particulate mixture may be contacted with the spillage of liquid chemical material by any convenient means. Preferably, the mixture is applied to the spillage using a mechanical device, for example of the type which is used to disperse solid particulate fire-extinguishing materials. Care should of course be exercised to ensure that the act of dispersing the solid particulate mixture does not result in the further spreading of the liquid chemical.

The solid particulate mixture may contain components other than the aforementioned polymer components. For example, the mixture may contain one or more solid particulate components which promotes the flow properties of the mixture, e.g. finely divided silica, suitably in a proportion of 1% to 10% by weight of the total weight of the solid particulate components.

The solid particulate mixture may also contain other components which are known to be useful in the treatment of spillages of liquid chemical materials, for example particulate absorbent materials, e.g. porous particulate inorganic materials which are generally inert to the chemical material. An example of such a material is particulate expanded perlite.

The solid particulate mixture of the present invention may be used to treat a large number of different types of hazardous liquid chemical materials. It is particularly effective in the treatment of concentrated hydrochloric acid, bromine, aqueous sodium cyanide, concentrated sulphuric acid including oleum up to 35%, concentrated nitric acid, chlorosulphonic acid, and titanium tetrachloride.

The invention is illustrated by the following examples.

EXAMPLE 1

100 ml of a 36% aqueous solution of hydrochloric acid was poured into a 100 mm diameter crystallising dish to give a liquid depth of 13 mm.

A solid particulate mixture comprising 50% by weight of polyacrylamide (particle size 0.2 to 0.5 mm diameter) and 50% by weight of polymethyl methacrylate (particle size 0.2 to 0.5 mm diameter) was sprinkled on the surface of the aqueous hydrochloric acid to a depth of 5 mm. This required 50 g of the particulate mixture. After this treatment there was no detectable fuming of the aqueous hydrochloric acid and the liquid had been formed into a gel.

By way of comparison the above procedure was repeated except that three separate applications of polyacrylamide alone were made, each to a depth of 5 mm. Only after the third application was there no detectable fuming of the aqueous hydrochloric acid.

EXAMPLE 2

The procedure of Example 1 above was repeated except that 100 ml of bromine were used in place of the aqueous solution of hydrochloric acid, and three separate applications of the 50:50 weight:weight particulate mixture of polyacrylamide and polymethyl methacrylate were made. A soft skin was formed over the bromine which stopped the evolution of fumes from the bromine.

By way of comparison the above procedure was repeated except that particulate polymethyl methacrylate alone was used in place of the 50:50 mixture of polyacrylamide and polymethyl methacrylate. Although formation of a skin over the bromine did take place the skin was formed much less rapidly than was the case where the particulate mixture of the invention was used.

EXAMPLE 3

The procedure of Example 2 was repeated except that titanium tetrachloride (100 ml) were used in place of the bromine of Example 2, and four separate applications of the 50:50 weight:weight particulate mixture of polyacrylamide and polymethyl methacrylate were made. A skin was formed over the titanium tetrachloride which stopped the evolution of fumes.

By way of comparison the above procedure was repeated except that particulate polymethyl methacrylate was used in place of the 50:50 mixture of polyacrylamide and polymethyl methacrylate. Although the formation of a skin over the titanium tetrachloride did take place the skin was formed much less rapidly than was the case where the particulate mixture of the invention was used.

I claim:

1. A method of treating a spillage of a hazardous liquid chemical to immobilize the spillage thereby mitigating potentially harmful effects therefrom, which method comprises contacting the liquid chemical spillage with a solid particulate mixture consisting essentially of a first component of a polyacrylamide or a polyalkyl acrylamide and a second component of a polymer or copolymer of an alkyl(alk)acrylate.

2. A method as claimed in claim 1 in which substantially the whole of the exposed surface of the liquid chemical is covered with a layer of the particulate mixture.

3. A method as claimed in claim 2 in which sufficient particulate mixture is used to form a solid layer on the surface of the liquid chemical or to form a gel with the liquid chemical.

4. A method as claimed in claim 1 in which the first component of the particulate mixture is polyacrylamide.

5. A method as claimed in claim 1 or 4 in which the second component of the particulate mixture is polymethyl methacrylate.

6. A method as claimed in claim 1 in which the particulate mixture contains 20% to 80% of polymer or copolymer of an alkyl(alk)acrylate by weight of the combined weight of the polyacrylamide and the polymer or copolymer of alkyl(alk)acrylate.

7. A method as claimed in claim 6 in which the particulate mixture contains 35% to 65% by weight of polymer or copolymer of an alkyl(alk)acrylate.

8. A method as claimed in claim 1 in which particle size of the solid particulate mixture is not greater than 5 mm.

9. A method as claimed in claim 1 in which the particle size of the solid particulate mixture is not greater than 3 mm.

10. A method as in claim 1 in which the solid particulate mixture further consists essentially of a third component of a solid material which promotes the flow properties of the mixture.

11. A method as claimed in claim 10 in which the solid flow-promoting component is present in the mixture in a proportion of 1% to 10% by weight of the total weight of the solid particulate components in the mixture.

* * * * *

UNITED STATES PATENT AND TRADEMARK OFFICE
CERTIFICATE OF CORRECTION

PATENT NO. : 4,383,868

DATED : May 17, 1983

INVENTOR(S) : Gordon K. Braley

It is certified that error appears in the above-identified patent and that said Letters Patent is hereby corrected as shown below:

On the title page Insert Assignee:

--Assignee: Imperial Chemical Industries PLC, London, England--

Signed and Sealed this

Third Day of July 1984

[SEAL]

Attest:

GERALD J. MOSSINGHOFF

Attesting Officer

Commissioner of Patents and Trademarks